United States Patent [19]

Huret et al.

[11] 4,002,080
[45] * Jan. 11, 1977

[54] DERAILLEUR GEAR FOR A BICYCLE

[76] Inventors: Roger Huret; Jacques Huret, both of 60, avenue Felix Faure, 92000 Nanterre, France

[*] Notice: The portion of the term of this patent subsequent to July 29, 1993, has been disclaimed.

[22] Filed: Feb. 19, 1975

[21] Appl. No.: 551,018

[52] U.S. Cl. .............................. 74/217 B; 74/242
[51] Int. Cl.² ...................... F16H 7/22; F16H 9/24
[58] Field of Search ............... 74/217 B, 242.11 B, 74/242.14 B, 242.15 B, 242; 280/236, 261, 217 B

[56] References Cited
UNITED STATES PATENTS 3,896,679  7/1975  Huret et al. ...................... 74/217 B

FOREIGN PATENTS OR APPLICATIONS 1,160,748  1/1964  Germany .......................... 74/217 B
1,095,695  12/1960  Germany .......................... 74/217 B Primary Examiner—Samuel Scott
Assistant Examiner—A. Russell Burke
Attorney, Agent, or Firm—Bacon & Thomas

[57] ABSTRACT

A derailleur gear for a bicycle comprises a chain displacement means having a rigid linkage part movable transversely of the rear wheel in a direction generally along the axis of the rear wheel of the bicycle, the linkage part forming a side link in a support parallelogram linkage that includes vertically movable interconnected link portions connected to the rigid linkage part, the support parallelogram being in a plane generally transverse to the axis of the rear wheel. The chain guide pulley or sprocket is rotatably mounted on a spindle carried by a vertically movable portion of the support parallelogram linkage, as is an elongated cap or arm member that supports a chain tension pulley at a remote end from the spindle-connected end. A coil spring normally resiliently biases the vertically movable portions of the support parallelogram upwardly generally towards the rear wheel axis, and various motion limiting features are included. The coil spring also maintains the chain tension pulley in desired position to maintain chain tension. The displacement means itself may be a parallelogram linkage lying in a plane extending transverse to the plane of the support parallelogram linkage, with the rigid linkage part comprising a mutual link connecting the parallelogram linkages in a novel manner.

12 Claims, 5 Drawing Figures

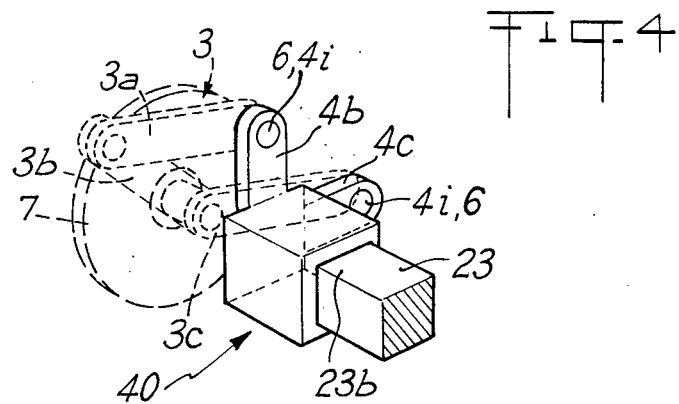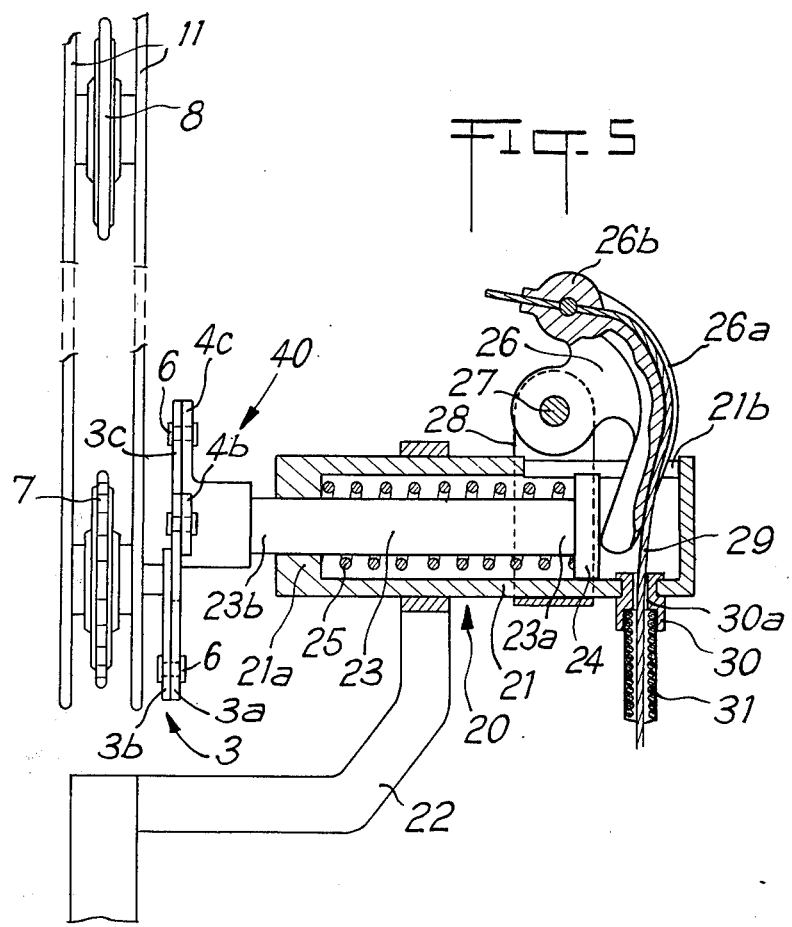

DERAILLEUR GEAR FOR A BICYCLE

BACKGROUND OF THE INVENTION

The present invention relates to a derailleur gear for a bicycle including a device for transverse displacement of the chains with respect to the rear wheel of the bicycle. This device could, for example, be a jack perpendicular to or oblique with respect to the plane of the rear wheel or a parallelogram linkage located in a plane parallel to the axis of the rear wheel of the said bicycle. One of the constituent elements of the device is fixed to the frame of the bicycle and is connected to a "support" parallelogram linkage located in a plane perpendicular to the axis of the rear wheel. One or more parts of the support parallelogram linkage serve as a vertically movable support for a spindle carrying a chain guide pulley or sprocket and an articulated cap or arm which supports a chain tension pulley.

In a known form of construction of this type of derailleur gear, two parallelogram linkages are used, one of which serves as support for the chain guide sprocket and the other of which serves for the transverse displacement of the said sprocket along the conical circumference of all the change-speed gears of the rear wheel. Thus, it is possible to ensure, on the one hand, due to a first parallelogram linkage, the displacement of the chain guide sprocket of the derailleur gear parallel or obliquely to the axis of the rear wheel of the bicycle, which displacement causes the chain to pass from one gear to another, and, on the other hand, due to a second "support" parallelogram linkage, the displacement of the guide sprocket in a direction having a component perpendicular to the axis of the rear wheel, which displacement permits the distance separating the axis of this chain guide sprocket from the rear wheel axis to be varied as a function of the diameter of the gear used in such a way that the sprocket is always in the immediate vicinity of the said gear. Of course, instead of the first parallelogram linkage, a jack can be used as a transverse displacement device, this jack thus being disposed by the side of all of the change-speed gears in such a way that its axis is parallel to the axis of the gears or to a conical generatrix defined by the gears.

This type of derailleur gear for a bicycle has the disadvantage that the rigidity of the means proposed to ensure the connection between the transverse displacement device and the support parallelogram linkage is not ensured in a manner which is sufficiently accurate to permit a really satisfactory functioning of the whole gear. Certain proposed derailleur gears of this type only have a single connecting screw to connect together two sides belonging to the first and to the second parallelogram respectively and there then arises, at the position of this connection, flexures which are a function of the chain tension and reaction forces exerted by various springs in this region which are incompatible with a geometric, stable and accurate positioning of the chain guide pulley.

SUMMARY OF THE INVENTION

It is an object of the present invention to provide a derailleur gear for a bicycle, such as a derailleur gear of the type mentioned above, in which the device for transverse displacement and the support parallelogram linkage are connected in such a manner that the position of one with regard to the other is perfectly and rigidly defined, in other words that, in the region of their connection, they have practically no play or possible deformations whatever, even in the presence of forces apart from the movements or displacements provided for and corresponding to their pivotal articulations.

According to the invention, there is provided a derailleur gear for a bicycle comprising displacement means including a first part rigidly attached to a frame part of the bicycle and a second part displaceable transversely to the plane of the rear wheel of the bicycle, a support parallelogram linkage in a plane perpendicular to the axis of said rear wheel of said bicycle, a spindle carried by a vertically moveable portion of said parallelogram linkage, a chain guide pulley or sprocket on said spindle, a pivotable arm member supported by said support parallelogram linkage, a chain tension pulley mounted on said pivotable arm member and a rigid connecting linkage part forming said second part of said displacement means and one side of said support parallelogram linkage.

BRIEF DESCRIPTION OF THE DRAWINGS

The invention will now be described in greater detail, by way of example, with reference to the drawings, in which:

FIG. 4 is a perspective view of a second form of embodiment of the rigid connection part, and FIG. 5 is a plan view and a partially sectional view of the rigid part according to FIG. 4 and serving for the connection between a displacement jack and the support parallelogram.

DESCRIPTION OF THE PREFERRED EMBODIMENTS

Basically the invention proposes that in a derailleur gear for a bicycle, for example of the type mentioned above, that one element of the transverse displacement device, which element is opposite to the member rigid with the frame, and one of the sides of the support parallelogram linkage are both constituted by one and the same rigid linkage part on which are secured at least two pivots, each pivot being secured to one of the ends of a pair of linkages; of the support parallelogram linkage, the latter linkages being movable in a vertical sense about the pivots.

Thus a first advantage of the present invention appears, in the fact that the rigid connection part belongs both to the transverse displacement device and to the support parallelogram linkage. Thus any possibility of any play between the said device and the said parallelogram is already eliminated by this and in addition, assuming the massive shape and structure given to this part and which will be described in detail later, any flexure or torsion of this latter are also eliminated or reduced to negligible orders of magnitude in the present case.

Figure 1:
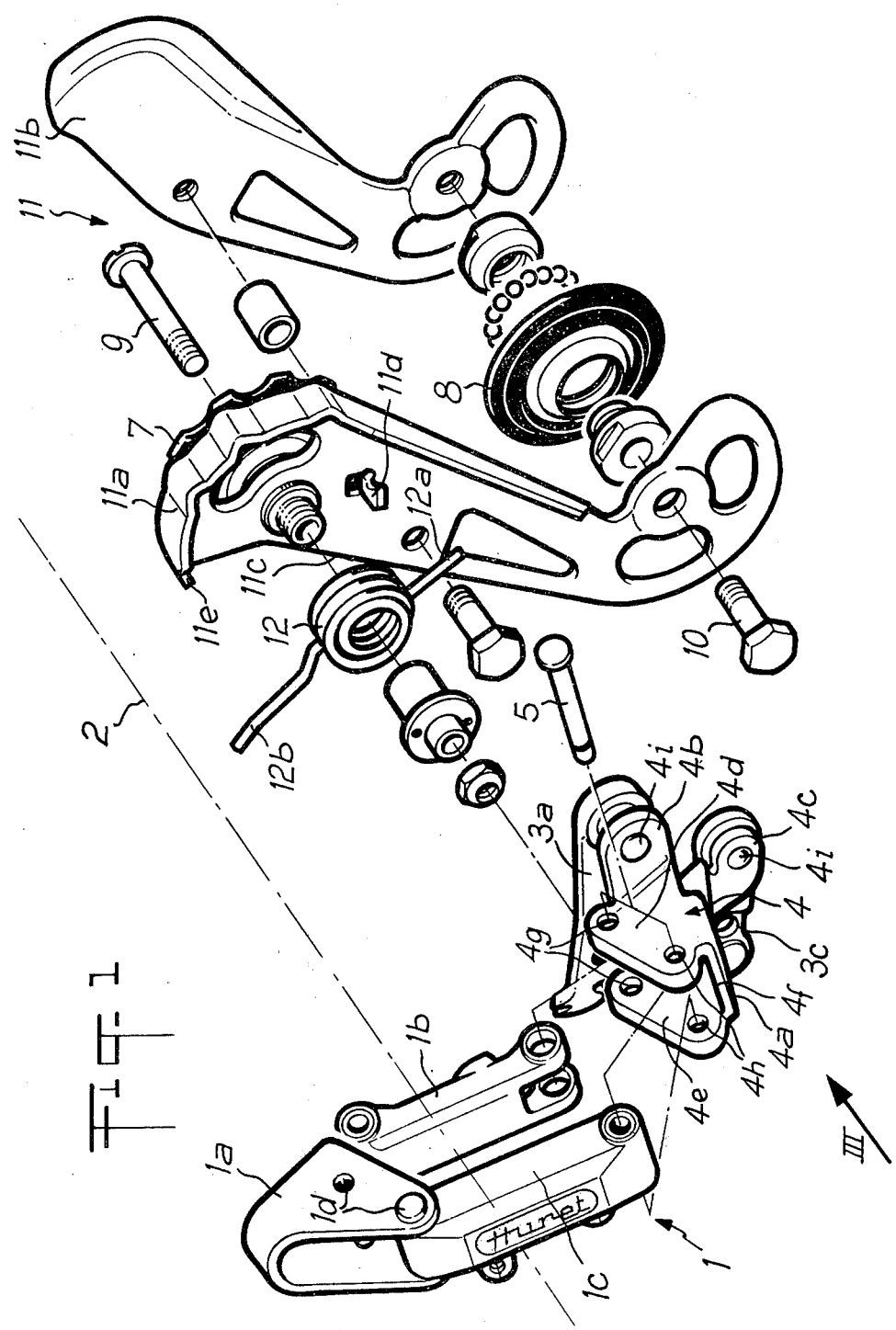
FIG. 1 is a perspective exploded view of a part of a first form of embodiment of a derailleur gear for a bicycle in accordance with the invention.

Referring now to the drawings, as can be seen in FIG. 1, the derailleur gear for a bicycle of the present invention comprises, for transverse displacement of the chain with respect to the rear wheel of the bicycle, a first parallelogram linkage 1 of which one of the sides is constituted by a cap 1a made rigid, for example by screwing with the frame of a bicycle which is not shown.

Two opposite sides of this first parallelogram linkage are constituted by two parallel side links or arms 1b and 1c each articulated about a pivot 1d mounted in the cap 1a.

This first parallelogram 1 is located in an inclined plane parallel to the axis, shown by line 2, of the rear wheel (not shown) of the bicycle.

Figure 2:
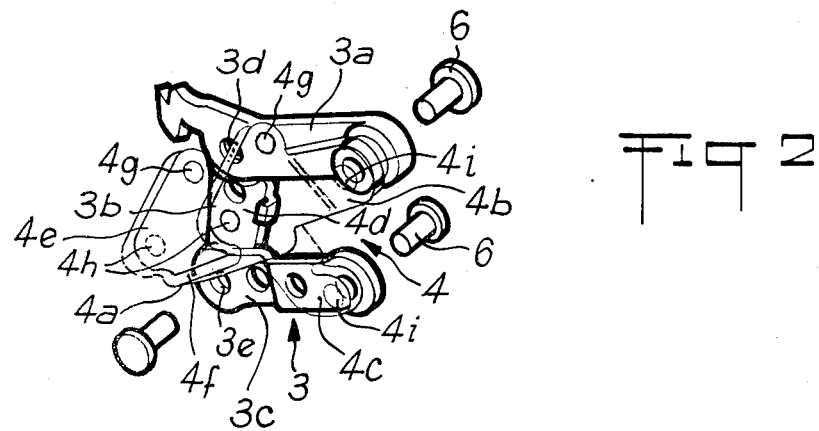
FIG. 2 is a perspective view of a part of the derailleur gear of FIG. 1 hidden by the rigid part of the invention.
Figure 3:
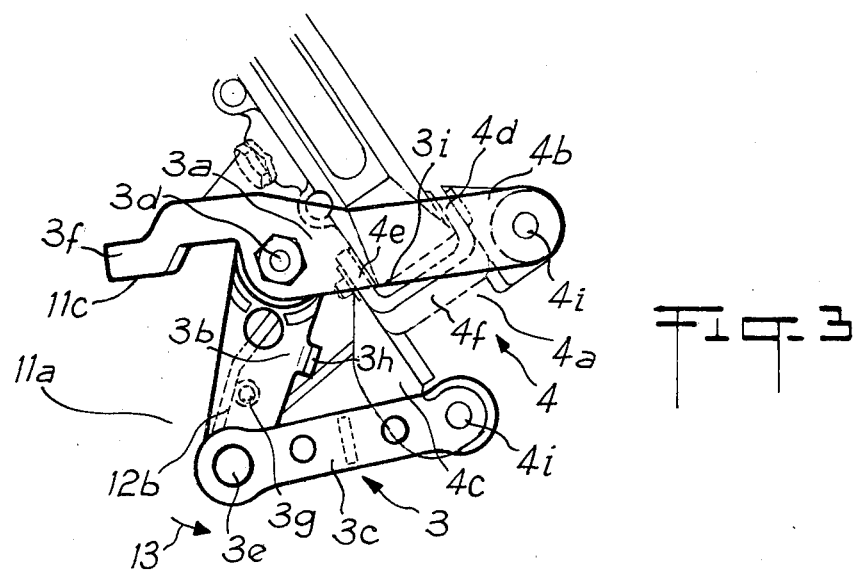
FIG. 3 is a partial view of the derailleur gear of FIG. 1 taken in the direction of the arrow III.

As can be seen in more detail in FIGS. 2 and 3, the derailleur gear for a bicycle also comprises a second so-called support parallelogram linkage 3 which comprises three vertically moveable arms or linkages 3a, 3b, 3c, pivoted to each other by two pivots 3d and 3e and situated in a plane perpendicular to the axis 2 of the rear wheel of the bicycle. This derailleur gear moreover comprises a rigid side linkage part 4 which provides the connection between these two parallelogram linkages. In accordance with a first form of embodiment, this rigid part 4 has, in part, the structure of a cap 4a in the form of a U provided with two ears 4b and 4c.

This bracket 4a comprises two parallel side plates 4d and 4e of which constitute the arms of the U shape connected together by a base plate 4f situated in a plane perpendicular to these two side plates 4d and 4e and forming the base of the bracket 4a.

The two side plates 4d and 4e of the bracket 4a are each pierced by two holes 4g and 4h, respectively aligned with the corresponding holes of the other side plates and intended to allow two pivot pins 5 to pass therethrough. Thus these pivots perpendicularly traverse the two side plates 4d and 4e and about each are pivoted the distal ends of links one of the two 1b and 1c of the first parallelogram linkage 1.

The axis of the two pivots 1d and the two pivot pins 5 which constitute the four apices of the first parallelogram linkage 1 are thus all parallel to each other and extend perpendicular to the plane of this displacement parallelogram linkage 1.

The pivot pins 5 can be secured at one or the other of their ends to a side plate 4d and 4e by which they are thus rigidly retained and the spacing between these side plates 4d and 4e is chosen such that, with respect to the thickness of the links 1b and 1c of the first parallelogram linkage 1, it just allows the links 1b and 1c the axial play (with respect to pivots 5) necessary for their pivoting about the said pivot pins 5.

The two ears 4b and 4c of the rigid part 4 are both situated in the same plane, which plane is perpendicular to these two side plates 4d and 4e of this same part 4, that is to say to that of the first parallelogram linkage 1. Each of these ears 4b and 4c is integral with one of the side plates 4d and 4e of the bracket 4a constituting this rigid part 4. Each of these ears 4b and 4c is pierced by a hole 4i intended to allow a pivot pin 6 to pass therethrough, which pivot pin is situated perpendicularly to the plane of the ears 4b and 4c which thus serve them as bearings, that is to say parallel to the axis 2 of the rear wheel of the bicycle.

The pivot pins 6 serve respectively as pivots for the vertically pivotting linkage 3a and of the second so-called support parallelogram linkage 3 of which they thus each constitute an apex. This derailleur gear finally comprises a drain guide sprocket 7 and a chain tension pulley 8 respectively mounted on the spindles 9 and 10 supported by a cap or arm member 11 preferably constituted by two side plates 11a and 11b pivoted about the said spindle 9.

This spindle 9 does, in fact, constitute the pivot 3d of the second parallelogram linkage 3 and can even be rigid with one of the links, such as the link 3a of this latter.

This link 3a of the second so-called support parallelogram linkage 3 comprises a stop element or flange 3f intended to co-operate with stop engaging portion of member 11 at the rear part 11c and the upper edge 11e of the side plate 11a of the cap or arm 11 to limit, in two directions, the angular rotation of the arm member 11 about its spindle 9. The member 11 is in effect brought back towards the rear in such a manner as to ensure the tension of the chain (not shown) by means of the pulley 8. This is achieved by means of a spiral spring 12 wrapped round the spindle 9 under tension and one end 12a of which is hung on a flange 11d provided on the side plate 11a of said member 11, and the other end 12b of which is hung on a flange 3g provided on the linkage 3b of the second support parallelogram 3 in such a way that the link 3b is biased by the spring 12 in the direction of the arrow 13 of FIG. 3. Thus, the vertically movable portions 3a, 3b and 3c of the second parallelogram linkage 3 and the chain tension pulley 8 are both biased towards the position in which they are respectively the closest and most distant from the axis 2 of the bicycle wheel. It should be noted that biasing of link 3b as shown by arrow 13 will normally tend to urge members 3a, 3b and 3c upwardly in a clockwise direction about pivots 6 in openings 4i to bring the cap or arm 11, along with guide sprocket 7 and tension pulley 8 upwardly on the bicycle generally closer to the axis 2 of the bicycle wheel (not shown). The spring 12 meanwhile resiliently urges arms 11 in a clockwise direction about spindle 9 to keep the tension pulley 8 in a low position with respect to axis 2.

This link 3b of the second parallelogram linkage 3 finally comprises a flange 3h intended to co-operate with the part 3i of the link 3a of this same parallelogram linkage 3 to limit movement of link 3b by the spring 12 in the direction of the arrow 13.

The functioning of the derailleur gear for a bicycle is substantially the same as that of known derailleur gears, but it will easily be understood, taking into account the position adopted for the rigid part 4, which constitutes in face, on the one hand, the side of the first parallelogram linkage 1 opposite the side 1a of this linkage rigid with the bicycle, and, on the other hand, the side opposite the side 3b of the second parallelogram linkage 3, that the position of this rigid part 4 with respect to the cap 1a rigid with the frame of the bicycle, is perfectly determined, and that the rigid part 4 consequently constitutes a perfectly stable base for securing the second parallelogram linkage 3, on which is mounted the or arm 11 carrying the guide sprocket 7 and the chain tension sprocket 8.

In addition it is possible in order to increase the rigidity still further, to make certain articulation pivots of the parallelogram linkage, and in particular the articulation pivot 6 of the link 3a (which carries the spindle 9 and the cap 11), rigid with the link which pivots on them, such as the link 3a.

The rigid connection part 40 as depicted in FIGS. 4 and 5 provides an analogous connection to that of the part 4 depicted mainly in FIG. 1. This rigid part 40 is provided between the support parallelogram linkage 3 and the transverse displacement device which, in the present case, is embodied by a jack 20. The cylinder 21 of the jack 20 is secured rigidly, for example with the help of a support arm 22, to the frame of a bicycle (not shown). This jack 20 comprises inside the cylinder 21, a rod 23, for example of square section, guided in the opening of a corresponding shape of the front part 21a of the said cylinder 21 and comprising, on its inner end 23a a bearing disc 24. A return spring 25 surrounds the rod 23 and is supported against, on the one hand, the front part 21a and, on the other hand, the bearing disc 24. On the side opposite the rod 23, the disc 24 cooperates with the end of a control lever 26 which penetrates into the interior of the cylinder 21 through a longitudinal slit 21b made in the wall of this cylinder 21 and which is pivoted outside the cylinder on a spindle 27 positioned in a support 28 secured on this cylinder 21. On the side opposite the disc 24, the lever 26 is provided with a guide groove 26a for the control cable 29, one end of which is screwed to the external end 26b of the lever 26. The cable 29 passes through the opening 30a of a stop 30 secured on the cylinder 21 opposite the slit 21b, this stop 30 serving as a support of one of the ends of the sheath 31 surrounding the cable 29.

The external end 23b of the rod 23 is secured on the rigid connection part 40 which has, for example, a recess of square section, in which recess is fitted, preferably without play, the external end 23b of the said rod 23. The rigid part 40 is made rigid with the external end 23b of the rod 23, for example with the help of a row or several points of solder, or of a pin or of a rivet passing through aligned holes made in the part 40 and in the end 23b. The rigid part 40 can advantageously be made by starting from a flat sheet of metal conveniently cut and subsequently bent in order to cover at least partially the end 23b of the rod 23. This part 40 is also provided with two plates or ears 4b and 4c which are located in the same plane, which can be perpendicular or oblique with respect to the axis of the rod 23 and each of which contains a hole 4i serving as a bearing for one of the articulation pivot pins 6 of the support parallelogram linkage 3. As in the form of embodiment in accordance with FIGS. 1 to 3, the support parallelogram linkage 3 comprises three vertically movable links 3a, 3b, 3c, of which the links 3a is pivoted to the ear 4b, of which the arm 3c is pivoted to the ear 4c and on which the arm 3b is pivoted to the dustal ends of arms 3a and 3c. The member 11 and the guide sprocket 7 are also mounted on the pivot pin 6 joining the arms 3a and 3b.

It will be understood that the above description of the present invention is susceptible to various modifications changes and adaptations.

What is claimed is:
1. A derailleur gear for a bicycle comprising:
 a. displacement means (1 or 20) including a first part (1a or 2l) rigidly attached to a frame part of a bicycle and a second part (4 or 40) connected to and supported by the first part and displaceable with respect to said first part in a direction generally transversely to the plane of the rear wheel of the bicycle;
 b. a support parallelogram linkage (3) including a vertically movable portion (3a, 3b, 3c) disposed generally in a plane perpendicular to the axis of the rear wheel of the bicycle, said vertically movable portion being pivotally connected to and supported by said second part of said displacement means, said second part comprising a rigid connecting side link of said support parallelogram linkage;
 c. a spindle (9) carried by said vertically movable portion of said support parallelogram linkage, said spindle extending in a direction transverse to the plane of the rear wheel of the bicycle;
 d. a chain guide sprocket (7) ratatably mounted on said spindle;
 e. an elongated arm member (11) pivotally connected to said vertically movable portion of said support parallelogram linkage for movement about an axis transverse to the plane of the rear wheel of the bicycle; and
 f. a chain tension pulley (8) rotatably supported by said arm member.

2. A gear as defined in claim 1, wherein said pivotable arm member is pivotally attached to said spindle with said chain guide pulley.

3. A gear as defined in claim 1, wherein said displacement means also comprises a parallelogram linkage.

4. A gear as defined in claim 3, wherein said rigid connecting side link includes a first pair of pivot pins (5) connected to two opposite sides (1b, 1c) of the displacement parallelogram linkage and a second pair of pivot pins (6) connected to two opposite sides (3a, 3c) of said support parallelogram linkage.

5. A gear as defined in claim 4, wherein the respective pivot pins of each of said pairs of pivot pins extend along parallel axes, the pivot pin axes extending transversely of the planes in which said parallelogram linkages to which they are connected are disposed.

6. A gear as defined in claim 5 wherein the axes of the pivot pin pairs extend in directions perpendicular to each other.

7. A gear as defined in claim 6, wherein said displacement parallelogram linkage includes a pair of parallel pivotable side links (1b, 1c) having distal ends opposite respective ends that are connected to a frame part of the bicycle, and wherein said rigid connecting side link (4) comprises a U-shaped bracket for receiving said distal ends between the upright legs (4d, 4e) of said U-shaped bracket, said first pair of pivot pins extending through said bracket and said distal ends for pivotally securing said distal ends between the upright legs of said U-shaped bracket, whereby displacement of said distal ends axially along said pivot pins is limited by said upright legs.

8. A gear as defined in claim 7, wherein said bracket includes a pair of ear sections disposed in a mutual plane that extends generally parallel to the plane of said support parallelogram linkage and perpendicular to the plane of the displacement parallelogram linkage, said second pair of pivot pins being carried by said ear sections.

9. A gear as defined in claim 2, wherein the vertically movable portion of said support parallelogram linkage includes three links, two of the three links being pivotally connected at one end to said rigid connecting side link and the third link being pivotally connected at its opposite ends to the distal ends of the said two links, and further wherein said spindle is an extension of one of the pivotal connections between said one link and one of the said two links.

10. A gear as defined in claim 9, and further including a return spring element for biasing the vertically movable portion of the support parallelogram linkage and the chain guide sprocket carried by the linkage towards the position at which they are closest to the rear wheel axis of said bicycle, said spring element comprising a coil spring (12) coiled under tension around the spindle and having a pair of end portions (12a, 12b) respectively engaging the arm member and the vertically movable portion of the support parallelogram linkage, the end portions biasing the support parallelogram linkage towards its highest position on the bicycle and towards the axis of the rear wheel of the bicycle.

11. A gear as defined in claim 10, further wherein said vertically movable portion of said support parallelogram linkage includes a stop element and said arm includes stop engaging portions for limiting pivotal movement of said arm member about said spindle.

12. A gear as defined in claim 10, further wherein said vertically movable portion of said support parallelogram linkage includes a stop element and said arm includes stop engaging portions for limiting pivotal movement of said arm member about said spindle, and further wherein one of said three vertically movable links includes a protruding flange which at least limits the extreme upward pivotal movement of said links by contact of said flange with another of the links at an extreme upward position.

* * * * *